No. 744,789. PATENTED NOV. 24, 1903.
C. S. OBETZ.
CREAMING CAN.
APPLICATION FILED MAR. 28, 1903.
NO MODEL.

Witnesses
M. E. Corder
Geo. E. Few.

Inventor
Charles S. Obetz
by Milo B. Stevens & Co.
Attorneys

No. 744,789. Patented November 24, 1903.

UNITED STATES PATENT OFFICE.

CHARLES S. OBETZ, OF BELLEVILLE, OHIO.

CREAMING-CAN.

SPECIFICATION forming part of Letters Patent No. 744,789, dated November 24, 1903.

Application filed March 28, 1903. Serial No. 149,969. (No model.)

*To all whom it may concern:*

Be it known that I, CHARLES S. OBETZ, a citizen of the United States, residing at Belleville, in the county of Richland and State of Ohio, have invented certain new and useful Improvements in Creaming-Cans; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates particularly to that class of milk cooling or creaming cans in which the milk-can is contained within a water vessel and in which a vertical tube extends within the can.

The object of the invention is to form an improved device of the kind stated in which a circulation of water is provided through the central tube.

A further object is to generally improve the construction of such cans.

Figure 1:
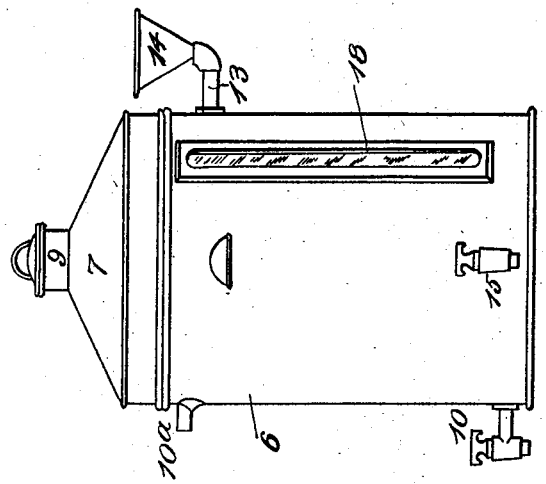
Figure 2:
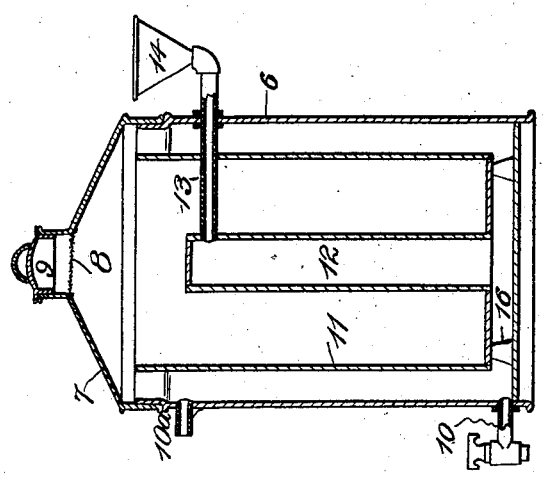
Figure 3:
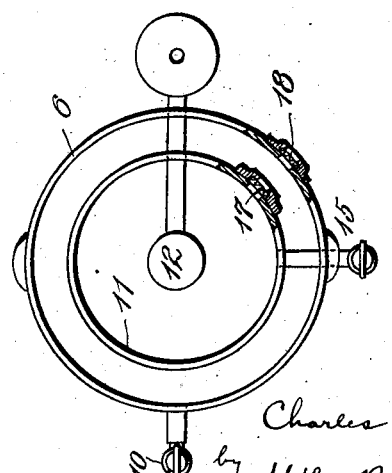

In the accompanying drawings, Figure 1 is a side elevation of the can. Fig. 2 is a vertical section thereof. Fig. 3 is a top plan view, partly in section, with the cover removed.

Referring specifically to the drawings, 6 indicates an outer water-can which is closed at the top by a cover 7, having at the center thereof an opening containing a strainer 8 and strainer-cover 9. The can is tapped at the bottom by a faucet 10, whereby the water may be drawn off when desired, and near the top by an overflow-pipe 10$^a$. Within the water-can and spaced from the bottom and sides thereof is a milk-can 11, through which extends a central vertical tube 12, which is closed at the top except where it receives the pipe 13, which extends thence through the side of both cans and has at the outer end a funnel 14, forming an inlet for the water-supply. The tube 12 is open at the lower end and communicates with the water-space under the milk-can. The milk-can is tapped at the bottom by a draw-off faucet 15, which extends through the side of the water-can. The milk-can is supported in position in the water-can by the inlet and outlet pipes and by a rest 16 under the bottom of the former.

At 17 and 18 are indicated gage-glasses in the sides of the milk-can and water-can, respectively. These glasses cover registering openings in the sides of both cans, so that the milk in the inner can can be seen from the outside without removing the cover. The height of milk and water in the respective cans can thus be seen.

The milk may be poured into the milk-can through the strainer 8 without removing the cover 7. The water-circulation takes place through the pipe 13 and down through the water-tube 12 and thence up around the outside of the milk-can and out through the overflow. The presence of the cooling-water at both the center and outside of the milk-can effects rapid creaming or cooling and the arrangement of milk and water inlets and outlets is such that the cans do not have to be removed or separated in the use of the device.

What I claim as new, and desire to secure by Letters Patent, is—

The combination with a water-can, and a milk-can within the same spaced from the sides and bottom thereof, of a central vertical tube in the milk-can, extending through the bottom thereof and closed at the top, and a water-inlet pipe extending through the sides of both cans and into the upper end of the tube.

In testimony whereof I affix my signature in presence of two witnesses.

CHARLES S. OBETZ.

Witnesses:
SAMUEL ELBE,
H. S. GARBER.